United States Patent [19]

Alsenz

[11] Patent Number: 5,428,966
[45] Date of Patent: Jul. 4, 1995

[54] REFRIGERATION SYSTEM UTILIZING AN EXPANSION DEVICE IN THE EVAPORATOR

[76] Inventor: Richard H. Alsenz, 2402 Creekmeadows, Missouri City, Tex. 77459

[21] Appl. No.: 88,764

[22] Filed: Jul. 8, 1993

Related U.S. Application Data

[63] Continuation of Ser. No. 665,028, Mar. 6, 1991, abandoned, which is a continuation-in-part of Ser. No. 505,557, Apr. 6, 1990, Pat. No. 5,115,644, which is a continuation-in-part of Ser. No. 146,285, Jan. 21, 1988, Pat. No. 4,951,475.

[51] Int. Cl.⁶ .................................. F25B 1/00
[52] U.S. Cl. ........................... 62/116; 62/225
[58] Field of Search ............. 62/116, 87, 225, 212

[56] References Cited

U.S. PATENT DOCUMENTS

| | | | |
|---|---|---|---|
| 1,836,318 | 12/1931 | Gay | 62/115 |
| 2,146,797 | 2/1939 | Dasher | 62/115 |
| 2,453,584 | 11/1948 | Newton | 62/225 |
| 2,494,120 | 1/1950 | Ferro | 62/116 X |
| 2,519,010 | 8/1950 | Zearfoss | 62/115 |
| 2,534,455 | 12/1950 | Koontz | 62/212 |
| 2,576,663 | 11/1951 | Atchison | 62/116 X |
| 2,737,031 | 3/1956 | Wulle | 62/116 |
| 2,763,995 | 9/1956 | Newton | 62/192 |
| 3,932,159 | 1/1976 | Goldsberry | 62/510 |
| 4,086,772 | 5/1978 | Williams | 60/651 |
| 4,094,169 | 6/1978 | Schmerzler | 62/498 |
| 4,170,116 | 10/1979 | Williams | 62/116 |
| 4,208,885 | 6/1980 | Schmerzler | 62/403 |
| 4,235,079 | 11/1980 | Masser | 62/87 |
| 4,304,099 | 12/1981 | Vakil | 62/86 |
| 4,790,145 | 12/1988 | Thompson | 62/212 |
| 4,823,560 | 4/1989 | Rowley et al. | 62/467 |
| 4,835,976 | 6/1989 | Torrence | 62/115 |
| 4,848,099 | 7/1989 | Beckey et al. | 62/212 |

OTHER PUBLICATIONS

Refrigeration & Air Conditioning; Jordan et al. 1948 pp. 315 & 316.

Primary Examiner—William E. Wayner
Attorney, Agent, or Firm—Paul S. Madan

[57] ABSTRACT

A closed loop refrigeration system utilizing an expansion device in the evaporation system is disclosed. In one embodiment, an expansion engine is connected to the evaporator inlet while a compressor is connected to the evaporator outlet. Liquid refrigerant flows through the expansion engine wherein it expands and drives the expansion engine. The compressor may be driven by the expansion engine or by a separate motor. A control circuit adjusts the refrigerant through the control valve in a manner which maintains a desired degree of superheat of the refrigerant leaving the compressor. In an alternate embodiment, the evaporator system has two evaporators. An expansion device is disposed between the inlet of the first evaporator and the outlet of the second evaporator. Partially subcooled liquid refrigerant from the first evaporator is passed into the second evaporator through an expansion valve wherein it evaporates into gas a refrigerant. Liquid refrigerant is discharged into the expansion device wherein it expands and raises the energy of the gas refrigerant arriving from the second evaporator into the expansion device. Liquid refrigerant from the expansion device is fed to the first evaporator while the gas refrigerant is passed on to a compressor. A control circuit adjusts the flow of the refrigerant into the expansion device.

13 Claims, 3 Drawing Sheets

REFRIGERATION SYSTEM UTILIZING AN EXPANSION DEVICE IN THE EVAPORATOR

CROSS-REFERENCE TO RELATED APPLICATIONS

This application is a continuation of application Ser. No. 07/665,028 filed Mar. 6, 1991, now abandoned which is a continuation-in-part of U.S. patent application Ser. No. 505,557, filed Apr. 6, 1990, now U.S. Pat. No. 5,115,644 which is a continuation-in-part of U.S. patent application Ser. No. 146,285, filed Jan. 21, 1988 now U.S. Pat. No. 4,951,475.

BACKGROUND OF THE INVENTION

1. Field of the Invention

This invention relates to a closed loop vapor cycle refrigeration system, and more particularly to apparatus and method for improving refrigeration efficiencies by utilizing an expansion device in the evaporator section of the refrigeration system and by controlling the refrigerant flow through the evaporator.

2. Description of the Related Art

Expansion devices such as expansion engines have been used in the vapor cycle of refrigeration systems in an effort to improve the overall efficiency of such systems. For example, U.S. Pat. Nos. 3,934,424, 4,170,116, 4,086,772, 4,094,169 and 4,208,885 teach the use of an expansion engine in a vapor cycle to improve the overall efficiency of the refrigeration system. However, these and other prior art systems have failed to raise the system efficiency because these systems do not properly control the flow of the refrigerant through the evaporator; therefore, these systems have failed to gain commercial acceptance. Furthermore, the art in general has taught against the use of expansion engines in refrigeration systems. For example, David Mooney in the textbook, *Mechanical Engineering* states that "in actual cases, after allowing for the irreversibility of the real engine process, the gain by use of the expansion engine is usually negligible and such machines are not used in modern vapor refrigeration plants."

In a closed loop refrigeration system, potential energy is stored in the pressure difference of the refrigerant between the high pressure side and the low pressure side. Energy is wasted when this potential energy is changed into kinetic energy in the expansion valve of the refrigeration system. Also, energy is stored in the liquid refrigerant temperature on the high pressure side, which is changed into kinetic energy of the molecules when the liquid refrigerant boils in the evaporator. The prior art refrigeration systems attempt to improve the efficiency by utilizing this kinetic energy to drive or operate an expansion engine, which in turn is used to perform some useful function. However, the prior art systems do not overcome the energy waste because these systems do not properly control the expansion valve throttling process and the flow of the refrigerant through the evaporator.

The use of an expansion engine as taught in prior art systems, i.e., on an evaporator, produces an inherent conflict, which can be understood by considering the following two extremes of the flow of the refrigerant through the evaporator.

In the one extreme, if the refrigerant leaving the expansion engine is completely vaporized, there will be little refrigeration accomplished by the system.

In the other extreme, if liquid refrigerant is allowed to enter the compressors, unnecessary load will be placed on the expansion engine causing a loss of efficiency or mechanical failure, The present invention addresses the above noted problems and provides a closed loop refrigeration in which improved efficiency is obtained by using a conventional expansion device such as an expansion engine or a novel expansion-compression-expansion valve in the evaporator and by controlling the refrigerant flow through the evaporator.

SUMMARY OF THE INVENTION

The present invention provides a closed loop refrigeration system that includes a condenser for condensing high pressure and high temperature gas refrigerant into a liquid, an evaporator system that includes an expansion device and a control circuit for controlling the liquid refrigerant through the expansion device.

In one embodiment, an expansion engine is disposed between the evaporator inlet and the condenser and a compressor coupled to the expansion engine is connected to the evaporator outlet. Liquid refrigerant flows through the expansion engine, wherein it expands and drives the expansion engine. The expansion engine, in turn, drives the compressor, which compresses the refrigerant leaving the evaporator. A control circuit adjusts the liquid refrigerant flow through the evaporator in a manner which maintains a desired superheat of the refrigerant leaving the evaporator.

In an alternate embodiment, the evaporator system contains two evaporators, a high pressure stage evaporator and a low pressure stage evaporator. An expansion device having an expansion chamber is disposed between the inlet of the high pressure stage evaporator and the outlet of the low pressure stage evaporator. Liquid refrigerant having high kinetic energy is discharged into the expansion chamber to produce a venturi effect. The liquid discharging into the chamber expands and loses some energy. The venturi effect enhances the flow of the refrigerant from the low pressure stage evaporator into the expansion chamber. A liquid gas separator connected between the expansion device and the high pressure stage evaporator inlet receives the refrigerant from the expansion chamber, separates the liquid and gas refrigerants, and passes only the liquid refrigerant to the high pressure stage evaporator. A portion of the liquid refrigerant from the high pressure stage evaporator is passed into the low pressure stage evaporator through an expansion valve. The refrigerant in the low pressure stage evaporator expands into a gas and discharges into the expansion chamber. A control circuit controls the liquid refrigerant flow through the expansion device in a manner which maintains a desired superheat of the refrigerant leaving the high pressure stage evaporator.

Examples of more important features of the invention have been summarized rather broadly in order that the detailed description thereof that follows may be better understood, and in order that the contribution to the art may be better appreciated. There are, of course, many additional features of the invention that will be described in detail hereinafter and which will form the subject of the claims appended hereto.

DESCRIPTION OF THE PREFERRED EMBODIMENTS

The present invention provides a closed loop vapor cycle refrigeration system wherein improved system efficiency is obtained by utilizing an expansion apparatus, such as an expansion engine-compressor combination, an expansion-compression-expansion valve or the like at the evaporator and by controlling the liquid refrigerant flow through such an expansion apparatus and the evaporator.

Figure 1:
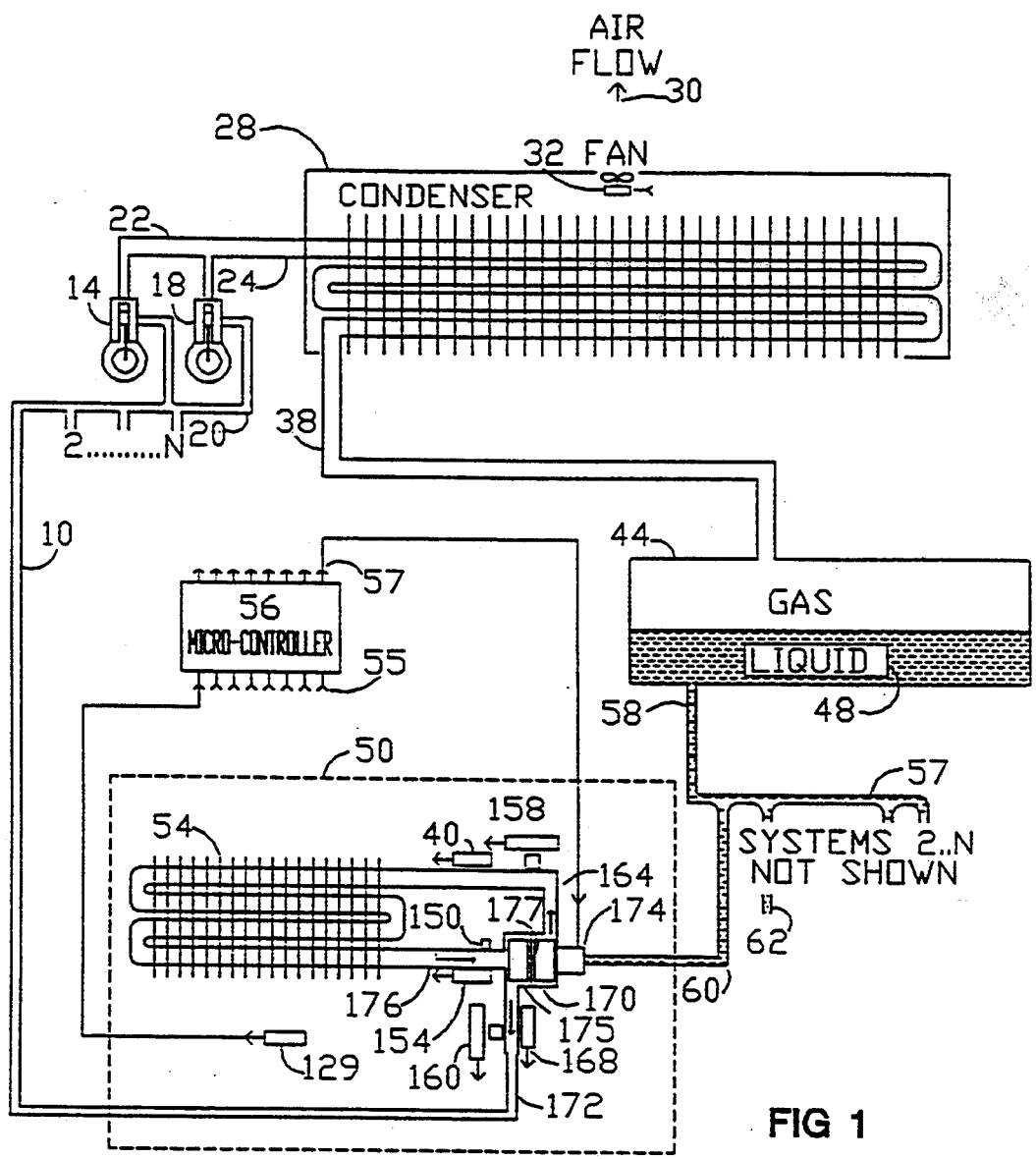
FIG. 1 shows a closed loop vapor cycle refrigeration system having an expansion engine-generator combination connected to the evaporator.

FIG. 1 shows an embodiment of the closed loop vapor cycle refrigeration system of the present invention. This system includes primary compressors 14 and 18 for compressing low pressure gas refrigerant to a high pressure, high temperature gas, a condenser 28, for condensing the compressed refrigerant to a liquid refrigerant by circulating air across the condenser by a fan 32, a reservoir 44 for storing the liquid refrigerant, one or more evaporator systems, like evaporator 50 that includes an evaporator 54 for evaporating liquid refrigerant to a low pressure, an expansion engine 170 connected to the evaporator inlet 164, a secondary compressor 175 connected to the evaporator outlet for compressing refrigerant leaving the evaporator 54, a control valve 174 for controlling the liquid refrigerant input to the expansion engine, and a micro-controller circuit 56 for controlling the operation of the refrigeration system, in response to information obtained from various temperature and pressure sensors installed in the refrigeration system.

Low pressure gas refrigerant from each evaporator is passed to compressors 14 and 18 through a suction manifold 20 via a refrigerant tube 10 and the like. The compressors compress the low pressure gas refrigerant to a high pressure and high temperature gas refrigerant. The high pressure gas refrigerant is passed through a condenser 28 wherein it is condensed to a low temperature liquid refrigerant by circulating air 30 across the condenser 28 by the fan 32. The fan 32 may be of a fixed speed or variable speed type. The air circulating across the condenser 28 removes thermal energy from the refrigerant and effects condensation of the refrigerant. The liquid refrigerant from the condenser 28 is discharged via a liquid return line 38 into a reservoir or receiver 44. The liquid refrigerant 48 accumulates in the reservoir 44 before it is discharged into a manifold 57 via a liquid line 58. The manifold 57 contains a plurality of outlets 1 through N, each of which is connected to a separate evaporator system. In FIG. 1, the first outlet of the manifold 57 is connected to the evaporator system 50 via a liquid line 60, while the remaining ports 2 through N may be connected to other evaporator systems (not shown).

The evaporator system 50 includes an evaporator 54, an expansion engine 170, a compressor 175, a pulse modulated solenoid valve 174 for controlling the liquid refrigerant flow from the reservoir 44 into the expansion engine 170, temperature sensors 40, 129, 154 and 168, and pressure sensors 158 and 160 for providing information to the micro-controller circuit 56 that controls the operation of the refrigeration system including the flow through the solenoid vane 174. The liquid line 60 feeds the liquid refrigerant to the solenoid valve 174. The expansion engine 170 is connected between the solenoid valve 174 and the inlet end 164 of the evaporator 54, while the secondary compressor 175, which is coupled to the expansion engine via a rotatable shaft 177, is connected to the outlet end 176 of the evaporator 54. A centrifugal compressor is preferred for use in the present invention, although any other suitable compressor may be used. The refrigerant leaves the evaporator in a gaseous state through tube 10, which as described earlier feeds the compressors 14 and 18 to complete the vapor refrigeration cycle, which during operation is continuously repeated.

The liquid refrigerant from the solenoid valve 174 passes through the expansion engine 170 wherein it expands. This expansion process within the expansion engine 170 removes some energy from the refrigerant, which energy will not have to be removed later in the evaporator 54 by expanding more refrigerant therein, thereby improving the overall efficiency Of the refrigeration system. The expansion of the liquid refrigerant drives (operates) the expansion engine 170, rotating the shaft 177, which drives the compressor 175. The compressor 175 compresses the refrigerant leaving the evaporator 54 and discharges it into the suction line 10 via a tube 172. The compressor 175 forms the first compression stage in the refrigeration system which enables one to use lower compression rate primary compressors 14 and 18. Also, the compressor 175 utilizes the energy produced by the expansion engine, which would otherwise have been wasted. Evaporators are typically located several feet away from the main compressors 14 and 18. In such applications, smaller diameter refrigerant tube 10 can be used due to the compression by compressor 175. Furthermore, the compression raises the refrigerant temperature at point 172 allowing the use of non-insulated tube 10. The use of non-insulated smaller diameter tube can result in savings, especially in refrigeration systems where the evaporator is placed at a great distance from the primary compressors 14 and 18.

Further efficiency improvement is obtained by controlling the refrigerant flow through the evaporator 54 so as to maintain a maximum amount of liquid in the evaporator while ensuing that no liquid enters the compressors 14 and 18.

As indicated earlier, prior art refrigeration systems utilizing an expansion engine-compressor combination do not realize the efficiency potential of such systems because the flow of the refrigerant through the evaporator is not optimally controlled, an aspect that thus far has gone unrecognized. Evaporator system efficiency for refrigeration systems which use an expansion engine in the evaporator increases when the refrigerant flowing through the evaporator is maintained in substantially a liquid state, while ensuring that no liquid enters the main compressors 14 and 18, which in the present invention is accomplished by controlling the liquid refrigerant flow through the solenoid valve 174 by the micro-controller circuit 56.

The micro-controller circuit 56 contains a micro-controller based circuit that includes, among other things, analog to digital converters, comparators and switching circuitry. The micro-controller circuit, in effect, controls the operation of the entire refrigeration systems by acquiring information from a variety of sensors and in response thereto controlling the operation of various system elements, including the solenoid valve 174, fan 32 and compressors 14 and 18. The micro-controller circuit 56 is operatively coupled via input ports 55 to temperature sensors 40, 129, 154 and 168, pressure sensors 158 and 160, liquid level sensor 150, the compressors 14 and 18, fan 32, and solenoid valve 174. The outgoing arrows at the sensors and the inward arrows at the micro-controller circuit 56, indicate that those sensors are operatively coupled to and provide relevant information to the micro-controller circuit 56. Similarly, the outgoing arrows at the micro-controller circuit 56 and inward arrows at system elements, such as the solenoid valve 174, compressors 14 and 18, and fan 32 indicate that the micro-controller circuit is operatively coupled to and controls the function of those elements.

The micro-controller circuit 56 receives temperature information from temperature sensors 40, 129, 154, and 168, and pressure information from pressure sensors 158 and 160, and in response thereto determines the superheat of the refrigerant leaving the evaporator and adjusts the refrigerant flow through the solenoid valve 174 so as to maintain the superheat of the refrigerant at a desired level, which may be a point value or a range. Alternatively, the micro-controller circuit 56 may receive electrical signals from the liquid level sensor placed near the evaporator outlet end which is representative of the liquid level and in response to those signals adjust the flow through the solenoid valve to ensure that the refrigerant flowing through the evaporator is maintained substantially in a liquid state. One method to ensure that the refrigerant passing through the outlet end 176 is in a liquid state is to maintain the superheat of the refrigerant at that end near zero. During operation, the micro-controller circuit 56 continually monitors the superheat of the refrigerant leaving the evaporator or at some point near the evaporator outlet. The micro-controller circuit 56 causes the solenoid valve to increase the refrigerant flow therethrough when the superheat of the refrigerant leaving the evaporator is above a predetermined value and causes the flow to decrease when the superheat is below a predetermined value. Alternatively, the micro-controller may be programmed to maintain the temperature or pressure of the refrigerant at point 172 at certain desired values by adjusting the refrigerant flow in a manner that will ensure that maximum amount of refrigerant in the evaporator is in the liquid state and that all of the refrigerant passing to the main compressors 14 and 18 is in gaseous state. The micro-controller circuit 56 is normally programmed to store precalculated values in the form commonly known in the art as look-up tables. The micro-processor optimizes the refrigeration system efficiency by measuring various temperatures and pressures, consulting the look-up tables in its memory and controlling the refrigerant flow through the solenoid valve, compressions to be done by each compressor stage (by the secondary compressor 175 and primary compressors 14 and 18) and by adjusting the amount of air circulation across the condenser by adjusting the speed of the fan for a given set of conditions.

A pulse modulated solenoid valve may preferably be used. Such valves impart liquid shock to the refrigerant each time they are turned on or turned off. The micro-controller circuit 56 is programmed to slowly turn on and off the solenoid valve to avoid such liquid shocks. U.S. Pat. No. 4,735,060 issued to the present inventor discloses a pulse controlled solenoid valve which is opened and closed in a manner that avoids liquid shock to the refrigerant. Applicant hereby incorporates by reference U.S. Pat. No. 4,735,060 into this patent application.

Figure 2:
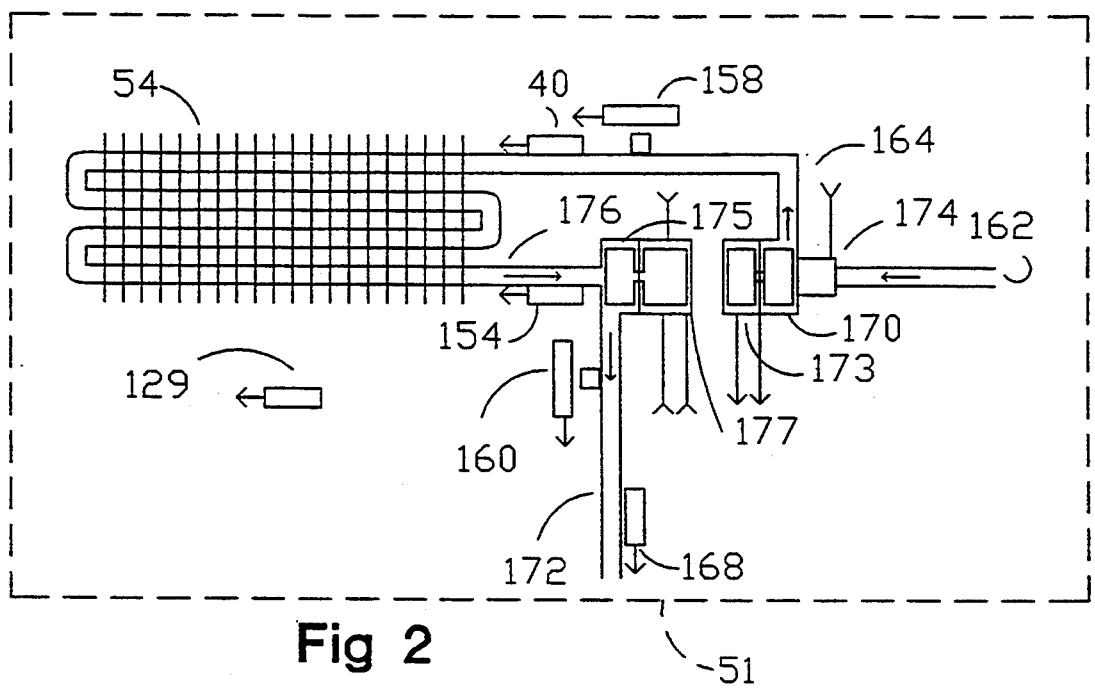
FIG. 2 shows an evaporator system wherein an expansion engine-generator combination is connected to the evaporator inlet and a motor driven compressor is connected to the evaporator outlet.

FIG. 2 shows an alternate embodiment of the evaporator system for use in the present invention. The evaporator system 51 may be used in place of the evaporator system 50 of FIG. 1. The operation of the evaporator system of FIG. 2 will now be described while referring to FIGS. 1 and 2. In the evaporator system of FIG. 2, the expansion engine 170 is connected to the evaporator inlet 164 much like in FIG. 1. However, the mechanical energy generated by the expansion process is used to drive a generator 173 or to perform some other useful function within or outside the refrigeration system. Like in FIG. 1, a secondary compressor 175 is connected to the evaporator outlet, but is independently driven by a separate motor 177. The separation of the compressor 175 from the expansion engine 170 provides an additional degree of control compared to the evaporator system of FIG. 1. The flow of the refrigerant through the evaporator is controlled in the same manner as described with respect to the system of FIG. 1 except that the operation of the compressor 175 is independently controlled by the micro-controller circuit 56.

In summary, the refrigeration systems of FIG. 1 and 2 utilize an expansion engine in the evaporator. The liquid refrigerant flowing through the expansion engine expands and drives the expansion engine. The expansion process removes some energy from the refrigerant, which would otherwise have to be removed in the evaporator, thereby improving the overall efficiency of the refrigeration system. Stated in other words, the liquid refrigerant is subcooled before it enters the evaporator. The mechanical energy produced in the expansion engine is used to perform some useful function, such as operating or driving a secondary compressor 175 to compress the refrigerant leaving the evaporator or to operate a generator 177 to produce electricity or to perform some other useful function. A control circuit controls the liquid refrigerant flow through the evaporator so as to maintain a desired level of superheat of the refrigerant leaving the evaporator.

Figure 3:
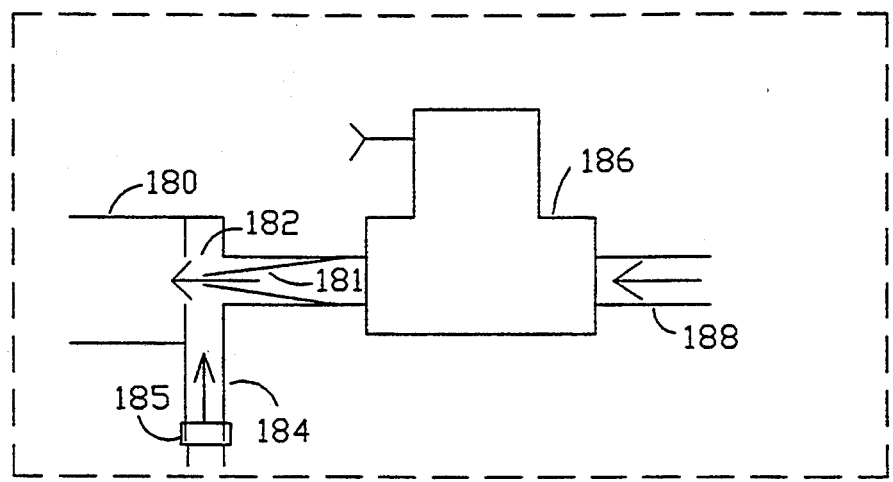
FIG. 3 shows an expansion-compression-expansion valve.
Figure 4:
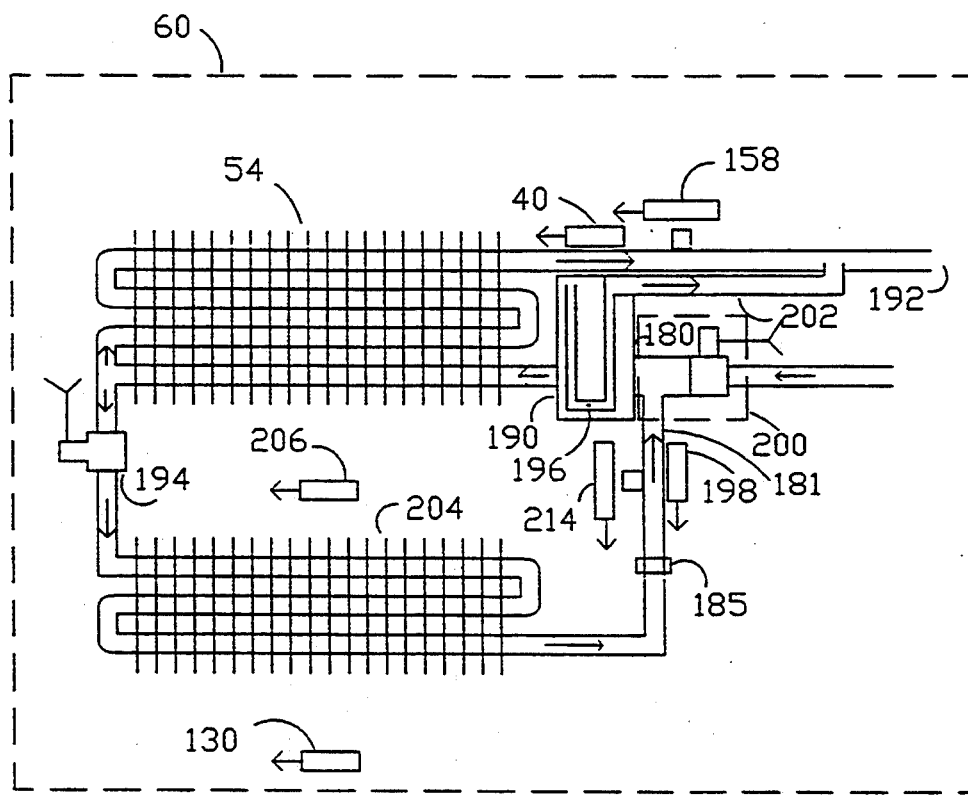
FIG. 4 shows a two stage evaporator system with an expansion-compression-expansion valve.

FIG. 4 shows another embodiment of the evaporator system of the present invention. This evaporator system 52 utilizes an expansion device 200. The expansion device 200 is an expansion-compression-expansion valve ("ECE Valve"). FIG. 3 shows in more detail the ECE Valve. The ECE Valve utilizes the venturi principle. The venturi effect, although well known, has not been utilized to convert energy produced due to the expansion of a refrigerant to improve compressor efficiency or to maintain a second lower temperature in a refrigerator system. The ECE Valve includes a control valve 186, which receives the liquid refrigerant from the reservoir 44 via a tube 162. The control valve 186 is preferably of the pulse modulated type. The liquid refrigerant from the control valve passes through a nozzle 181 and discharges into a chamber 182. The chamber 182 has an outlet tube 180 and an inlet tube 184. The outlet tube 180 provides refrigerant to an evaporator, like the evaporator 54 of FIG. 1, while the inlet tube 184 serves as a return line from the same or a different evaporator. A check valve 185 may be placed in the tube 184 to control the refrigerant flow to the chamber 182. The high energy molecules discharge through the nozzle 181 and lose energy to the lower energy molecules arriving through tube 184, resulting in a higher net refrigerating effect per unit weight of refrigerant circulating through the refrigeration system, thereby achieving a lower temperature than that which would be achieved by a refrigeration system running at the same pressure with a conventional expansion valve. Thus, the kinetic energy of the liquid refrigerant flowing through the expansion chamber 182 is used to raise the energy of the molecules arriving through tube 184 to the pressure level of tube 180. The ECE Valve 200 has no moving parts other than the pulse modulated solenoid 186. The solenoid 186 may be replaced by any other suitable means to control the liquid refrigerant flow through the ECE Valve 200.

Referring back to FIG. 4, it shows a two stage evaporator system 60. The function and operation of this system will now be described while referring to FIGS. 1, 3 and 4. The evaporator system 60 contains a high pressure evaporator 54 and a low pressure evaporator 204, a conventional expansion valve 194 between the two evaporators, a liquid-gas separator 190, an ECE Valve 200 and various pressure and temperature sensors operatively coupled to the micro-controller circuit 56. The evaporator system 60 may be used in the refrigeration system of FIG. 1 or in any other vapor cycle refrigeration system. The evaporators 54 and 204 are separated by a valve 194. The outlet tube 180 of the ECE Valve 200 is connected to the inlet end of the first evaporator 54 via a liquid gas separator 190 while the inlet tube 184 of the ECE Valve is connected to the outlet end of the second evaporator 204. The outlet end 192 of the evaporator 54 and the outlet end 202 of the liquid gas separator 190 are connected together to pass the gas refrigerant from the first evaporator and the separator to the compressors 14 and 18 through the gas tube 10 (see FIG. 1). Temperature sensor 206 provides temperature of the area refrigerated by the evaporator 54 while the temperature sensor 130 provides the temperature of the area refrigerated by the evaporator 204. The temperature sensors 40 and 198 provide refrigerant temperature at the outlet ends of the evaporators 54 and 204 respectively. Pressure sensors 158 and 214 are installed in the refrigerant tubes and provide pressure values in the evaporators 54 and 204 respectively. All of the temperature sensors, pressure sensors, the solenoid valve 186 and the expansion valve 194 are operatively coupled to the micro-controller circuit in a manner similar to the manner described above with respect to FIG. 1.

During operation, the liquid refrigerant from the reservoir 44 (see FIG. 1) is pulse modulated through the ECE Valve 200 and discharged through the nozzle 181 into the expansion chamber 182 to produce the venturi effect therein. The liquid refrigerant entering the chamber 182 expands and loses some energy. The refrigerant discharging through the nozzle 181 has high kinetic energy. The kinetic energy of the refrigerant leaving the nozzle 181 raises the energy of the gas molecules arriving from the evaporator 204 through the tube 184, thereby aiding the discharge of the gas from the evaporator 204 into the liquid-gas separator and, thus, improving the efficiency of the evaporator 204.

The liquid refrigerant accumulates at the bottom of the separator 190 and flows into the evaporator 54 while the gas follows the path as indicated by arrows and returns to the compressors 14 and 18 through tubes 202 and 192. Any oil accumulating in the separator 190 is siphoned out through a hole 196. The expansion of the liquid refrigerant by the ECE valve 200, before it enters the evaporator 54, reduces the pressure drop within the evaporator 54 which allows the use of smaller diameter tube in the evaporator. The liquid refrigerant travels through the evaporator 54, a portion of which is supplied to the expansion valve 194. The micro-controller circuit 56 receives temperature information from sensors 206, 40 and pressure information from sensors 158 and in response thereto controls the liquid refrigerant flow through the evaporator 54 so as to maintain a desired level of superheat of the refrigerant leaving the evaporator. Similarly, the micro-controller circuit 56 receives information from the area temperature sensor 129, refrigerant temperature sensor 198 and the evaporator pressure sensor 214 to control the refrigerant flow through the expansion valve 194 to maintain a desired temperature in the area where temperature sensor 130 is located. The evaporator 204 operates at a lower pressure and temperature than the evaporator 54 and thus may be used to maintain a lower temperature of the area where temperature sensor 130 is placed. A check valve 185 (preset or electrically controlled) may be installed in the tube 184 to control the flow of the refrigerant leaving the evaporator 204. The use of the ECE valve of the present invention in the manner shown in FIG. 4 utilizes the liquid refrigerant expansion to improve the efficiency of the refrigeration system while ensuring that liquid refrigerant is passed into the evaporators. Further, the second evaporator 204 is more efficiently able to maintain a lower area temperature in the area controlled by temperature sensor 130. Typical application of such a second evaporator would be in household refrigerators.

A significant advantage of the above described refrigeration systems is that a large majority of the existing refrigeration systems can easily be modified to incorporate significant aspects of the present invention, such as the expansion engine compressor combination or the expansion-compression-expansion valve and required micro-controller circuit.

The foregoing descriptions are directed to particular embodiments of the invention for the purpose of illustration and explanation. It will be apparent, however, to one skilled in the art that many modifications and changes to the embodiments set forth above are possible without departing from the scope and the spirit of the invention. It is intended that the following claims be interpreted to embrace all such changes and modifications.

What is claimed is:

1. A method for providing refrigeration for a refrigeration system having in a closed loop connection a condenser for condensing compressed gas refrigerant into a liquid refrigerant, an evaporator having an inlet and outlet end for evaporating the liquid refrigerant therein to a low pressure gas and for discharging the low pressure gas at the evaporator outlet, an expansion engine connected to the evaporator inlet end, said expansion engine driving a compressor connected to the evaporator outlet end, said method comprising the steps of:

(a) passing the liquid refrigerant to the expansion engine for expanding the liquid refrigerant therein and driving the expansion engine;

(b) passing the liquid refrigerant from the expansion engine to the evaporator for evaporating the liquid refrigerant into the low pressure gas refrigerant;

(c) driving the compressor by the expansion engine to compress the low pressure gas refrigerant from the evaporator; and (d) controlling the liquid refrigerant flow through the expansion engine in a manner which ensures that no liquid refrigerant passes to the compressor being driven by the expansion engine while maintaining the maximum amount of refrigerant in the evaporator in the liquid form.

2. A refrigeration system having in a closed loop:

(a) a condenser for condensing high pressure, high temperature gas refrigerant into a liquid refrigerant;

(b) an evaporator having an inlet and outlet for evaporating said liquid refrigerant into a low pressure gas refrigerant;

(c) an expansion engine coupled to the evaporator inlet for expanding the liquid refrigerant therein and for driving the expansion engine, said expansion engine discharging the liquid refrigerant into the evaporator;

(d) a compressor connected to the evaporator outlet for compressing the low pressure gas refrigerant from the evaporator, said compressor also coupled to and being driven by the expansion engine;

(e) a control valve coupled between the expansion engine for controlling the refrigerant flow into the expansion engine; and (f) a control circuit operatively coupled to the control valve for controlling the liquid refrigerant flow through the expansion engine in a manner which ensures that no liquid refrigerant passes to the compressor coupled to the expansion engine while maintaining maximum amount of the refrigerant in the evaporator in the liquid form.

3. The refrigeration system of claim 2, wherein the control valve is a pulse modulated solenoid valve.

4. The refrigeration system of claim 3 wherein said control circuit slowly opens and closes the pulse modulated solenoid valve to control the refrigerant flow therethrough so as not to impart any liquid shock in the refrigerant.

5. The refrigeration system of claim 2, wherein the control circuit includes a micro-processor, a temperature sensor placed near the evaporator outlet and a pressure sensor placed in the evaporator, said microprocessor receiving electrical signals representative of the temperature and pressure from said temperature and pressure sensors respectively and in response thereto causing the control valve to increase the fluid flow therethrough when the superheat of the refrigerant at the temperature sensor is above a predetermined value and to decrease the refrigerant flow when the superheat is below a predetermined value.

6. The refrigeration system of claim 2, wherein the control circuit determines the superheat of the refrigerant at the evaporator outlet and causes the control valve to increase the liquid refrigerant flow to the expansion engine when the superheat is above a predetermined value and decrease the flow when the superheat is below the predetermined value.

7. A refrigeration method, comprising the steps of:

(a) passing a high pressure liquid refrigerant through an expansion engine for driving the expansion engine;

(b) passing the liquid refrigerant from the expansion engine into an evaporator, said evaporator evaporating the received liquid refrigerant into a low pressure gas refrigerant and discharging the low pressure gas at an evaporator outlet;

(c) compressing the low pressure gas refrigerant from the evaporator by a compressor coupled to the evaporator outlet, the compressor being driven by the expansion engine; and (d) adjusting the liquid refrigerant flow into the expansion engine in a manner that ensures that no liquid refrigerant passes to the compressor while maintaining the maximum amount of the refrigerant in the evaporator in the liquid form.

8. A refrigeration method, comprising the steps of:

(a) passing a high pressure liquid refrigerant through an expansion engine for driving the expansion engine;

(b) passing the liquid refrigerant from the expansion engine into an evaporator, said evaporator evaporating the received liquid refrigerant into a low pressure gas refrigerant and discharging the low pressure gas at an evaporator outlet;

(c) compressing the low pressure gas refrigerant from the evaporator by a first compressor coupled to the evaporator outlet, the first compressor being driven by the expansion engine;

(d) adjusting the liquid refrigerant flow into the expansion engine in a manner that ensures that no liquid refrigerant passes to the compressor while maintaining the maximum amount of the refrigerant in the evaporator in the liquid form;

(e) compressing the gas refrigerant from the first compressor to a high pressure gas refrigerant by a second compressor; and (f) condensing the high pressure gas to the high pressure liquid refrigerant.

9. A refrigeration method, comprising the steps of:

(a) passing a high pressure liquid refrigerant through an expansion engine for driving the expansion engine;

(b) passing the liquid refrigerant from the expansion engine into an evaporator for evaporating such liquid refrigerant into a low pressure gas refrigerant, said evaporator discharging the low pressure gas at an evaporator outlet;

(c) compressing the low pressure gas refrigerant from the evaporator to an intermediate pressure by a first compressor coupled to the evaporator outlet, said first compressor being driven by the expansion engine;

(d) determining the superheat of the low pressure gas refrigerant at the evaporator outlet;

(e) adjusting the liquid refrigerant flow into the expansion engine so as to maintain the superheat of the low pressure gas refrigerant below a predetermined value;

(f) compressing the intermediate pressure gas refrigerant into a high pressure gas by a second compressor; and (g) condensing the high pressure gas refrigerant into the high pressure liquid refrigerant.

10. A refrigeration method, comprising the steps of:

(a) passing a high pressure liquid refrigerant through an expansion engine for driving the expansion engine;

(b) passing the liquid refrigerant from the expansion engine into an evaporator for evaporating such liquid refrigerant into a low pressure gas refrigerant, said evaporator discharging the low pressure gas at an evaporator outlet;

(c) compressing the low pressure gas refrigerant from the evaporator to an intermediate pressure by a first compressor coupled to the evaporator outlet, said first compressor being driven by the expansion engine;

(d) determining the superheat of the low pressure gas refrigerant at the evaporator outlet;

(e) adjusting the liquid refrigerant flow into the expansion engine so as to maintain the superheat of the low pressure gas refrigerant at zero;

(f) compressing the intermediate pressure gas refrigerant into a high pressure gas by a second compressor; and (g) condensing the high pressure gas refrigerant into the high pressure liquid refrigerant.

11. A closed loop refrigeration system, comprising:

(a) a receiver for storing therein a liquid refrigerant;

(b) an evaporator having an inlet end and outlet end, said evaporator adapted to receive the liquid refrigerant from the receiver, said evaporator evaporating the received liquid refrigerant into a low pressure gas and discharging the low pressure gas at the evaporator outlet end;

(c) a control valve having an inlet end and outlet end, said inlet end of the control valve coupled to the receiver for receiving liquid refrigerant from the receiver, said control valve adapted to control the valve;

(d) an expansion engine coupled to the inlet end of the evaporator and the outlet end of the control valve, the expansion engine receiving the liquid refrigerant from the control valve, the received liquid refrigerant expanding in the expansion engine and driving the expansion engine, said expansion engine discharging the refrigerant it receives from the control valve to the evaporator; and (e) a compressor coupled to the expansion engine and to the outlet end of the evaporator, said expansion engine driving the compressor, said compressor compressing the low pressure gas from the evaporator to an intermediate pressure; and (f) a control circuit coupled to the control valve, said control circuit causing the control valve to adjust the flow of the liquid refrigerant to the expansion engine so as to ensure that no liquid refrigerant passes to the compressor while maintaining maximum amount of the refrigerant in the evaporator in the liquid form.

12. A closed loop refrigeration system, comprising:

(a) a first compressor for compressing gas refrigerant to a high pressure;

(b) a condenser coupled to the first compressor for condensing the high pressure gas to a liquid refrigerant and discharging it to a condenser outlet end;

(c) a receiver coupled to the condenser outlet end for receiving the liquid refrigerant from the condenser and for storing liquid refrigerant;

(d) an evaporator having an inlet end and outlet end, said evaporator adapted to receive the liquid refrigerant from the receiver, said evaporator evaporating the received liquid refrigerant into a low pressure gas and discharging the low pressure gas at the evaporator outlet end;

(e) a control valve having an inlet end and outlet end, said inlet end of the control valve coupled to the receiver for receiving liquid refrigerant from the receiver, said control valve adapted to control the liquid refrigerant flow from the receiver to the outlet of the control valve;

(f) an expansion engine coupled to the inlet end of the evaporator and the outlet end of the control valve, the expansion engine receiving the liquid refrigerant from the control valve, the received liquid refrigerant expanding in the expansion engine and driving the expansion engine, said expansion engine discharging the refrigerant it receives from the control valve to the evaporator;

(g) a compressor coupled to the expansion engine and to the outlet end of the evaporator, said expansion engine driving the compressor, said compressor compressing the low pressure gas from the evaporator to an intermediate pressure;

(h) a first temperature sensor coupled to the evaporator inlet end for providing signals that are representative of the temperature of the refrigerant entering the evaporator;

(i) a second temperature sensor coupled to the evaporator outlet end for providing signals that are representative of the temperature of the refrigerant leaving the evaporator; and (j) a control circuit coupled to the first and second temperature sensors and to the control valve, said control circuit determining superheat of the refrigerant leaving the evaporator from the signals provided by the first and second temperature sensors and causing the control valve to increase the refrigerant flow to the expansion engine when the superheat is above a predetermined value and to decrease the flow when the superheat is below the predetermined value.

13. The apparatus of claim 12, wherein the control circuit contains a micro-controller.

* * * * *